United States Patent [19]
Moore

[11] 4,037,113

[45] July 19, 1977

[54] FLAME DETECTOR

[75] Inventor: William J. Moore, Dallas, Tex.

[73] Assignee: Forney Engineering Company, Carrollton, Tex.

[21] Appl. No.: 735,477

[22] Filed: Oct. 26, 1976

Related U.S. Application Data

[63] Continuation of Ser. No. 567,450, April 11, 1975, abandoned, which is a continuation-in-part of Ser. No. 451,636, March 15, 1974, abandoned.

[51] Int. Cl.² .............................................. G01N 21/58
[52] U.S. Cl. .................................. 250/554; 250/227; 350/96 R
[58] Field of Search ............................ 250/227, 554; 340/228.2; 350/96 R, 96 B; 431/32, 48; 356/87, 187

[56] References Cited

U.S. PATENT DOCUMENTS

| 2,975,785 | 3/1961 | Sheldon | 350/96 B |
| 3,216,477 | 11/1965 | Devine | 350/96 B |
| 3,692,415 | 9/1972 | Shiller | 250/227 |

Primary Examiner—David C. Nelms
Attorney, Agent, or Firm—Marvin A. Naigur; John E. Wilson

[57] ABSTRACT

A flame detector device for use with boiler systems has been devised wherein a radiation sensitive means responds when energized by incident radiation of the selective frequency bandwidth to produce a signal indicative of the existence of a flame. A light pipe means includes a lens system for collecting incident radiation in a selected combustion zone of the flame and a flexible tube couples the radiation sensitive means and the lens system. A fiber optics bundle conveys the collected incident radiation from the lens system to the detector and is of an extruded high purity unclad quartz material thereof.

6 Claims, 4 Drawing Figures

FLAME DETECTOR

REFERENCE TO RELATED APPLICATION

This is a continuation of U.S. Pat. application Ser. No. 567,450, filed on Apr. 11, 1975, now abandoned, which is a continuation-in-part of the U.S. Pat. application Ser. No. 451,636, filed on Mar. 15, 1974, now abandoned.

BACKGROUND OF THE INVENTION

The present invention relates generally to flame detectors and specifically to an apparatus for conducting radiation from the combustion zone of a burner to a detector device.

An essential element in the safety and control of boilers used in power generating equipment, and the like, is the ability to reliably detect the existence of flame at the burner. A detector of this sort, which has proved remarkably effective, is disclosed in a co-pending application of Horn, U.S. Ser. No. 425,039, filed Dec. 14, 1973. This detector is, as well as others may be, utilized in conjunction with the present invention in those applications where a straight line of sight may not be available to view a selected burner combustion zone.

In the above noted application, the combustion zone was selected for its useful concentration of infrared radiation. While it is not intended to limit the present invention to that portion of the spectrum, it is a useful area to discuss for purposes of explanation.

In certain boilers, burners are constructed so as to be movable during firing and it has been found that a useful area of the combustion zone may not be within the line of sight of the detector at all times. The invention disclosed herein therefore is especially useful for these applications.

The choice of a fiber optic system seems a reasonable beginning for such a system. However, various difficulties revealed themselves in the course of development. One especially troublesome problem was the transmission characteristics of the energy transmitted. For example, energy outside the visible spectrum is required for an accurate determination of the existence of a main burner flame in many applications, however, many fiber optic materials were found to attenuate the energy so drastically as to render the signals obtained essentially useless. Conventional fiber optics materials proved unsatisfactory. Other materials exhibiting proper transmission characteristics were not suited for adaptation to a fiber optics application.

Another major difficulty encountered was the high temperature environment within the boiler which would fuse the bundle and render it ineffective.

In addition to the foregoing difficulties, there are limits to which different bundles of optics may be flexed and for a particular size of the individual fibers, these considerations added to the constraints in the development of the subject of the present invention.

The present invention was developed so as to be adaptable with the highly effective detector described above in the Horm application. However, other detectors responsive to radiant energy may be used. For example, in the present invention, since the attenuation of the energy transmittal is extremely low from one end of the fiber optics bundle to the other, it can be said that any detector system which can directly view the flame or burner combustion zone can also be utilized with the present invention in the event that it is necessary to place the detector remotely from the combustion zone of the burner.

In addition to the foregoing, it has been found that fiber optics have a tendency to exhibit substantial optical losses unless each of the fibers in the optics bundle is clad with a material which reduces interference between adjacent fibers in the bundle. The cladding, however, has a tendency to deteriorate in the hostile environment of a furnace burner area. With certain fiber optics materials, therefore, it has been found that unsatisfactory optical communication is exhibited, thus rendering some systems ineffective to transmit a sufficient quantity of radiation from the combustion zone to a remote receiving device.

It is therefore an object of the present invention to provide a flame detection system for use with burners of a movable type.

It is another object of the present invention to provide a flame detection system wherein the detector may be remotely located from the burner combustion zone.

It is another object of the present invention to provide a flame detector apparatus wherein energy from a selected area of the combustion zone is communicated to the detector for reliable indication of the existence of a flame.

It is yet another object of the present invention to provide a flame detector apparatus utilizing an improved optical system capable of transmitting sufficient quantities of radiation for detection of a flame.

SUMMARY OF THE INVENTION

There has been provided a flame detection device for boiler systems wherein a radiation sensitive means is responsive when energized by incident radiation of a selected bandwidth to produce a signal indicative of the existence of flame. A light pipe means including a lens system collects incident radiation in a selected area of the combustion zone of a burner and a flexible tube couples the radiation sensitive means and the lens system. A fiber optics bundle conveys the collected incident radiation from the lens system to the detector, said fiber optics bundle of an extruded high purity unclad quartz material capable of conveying the radiation without significant attenuation thereof.

For a better understanding of the present invention together with other and further objects thereof, reference is directed to the following description taken in connection with the accompanying drawings, while its scope will be pointed out in the appended claims.

DESCRIPTION OF THE PREFERRED EMBODIMENT

Figure 1:
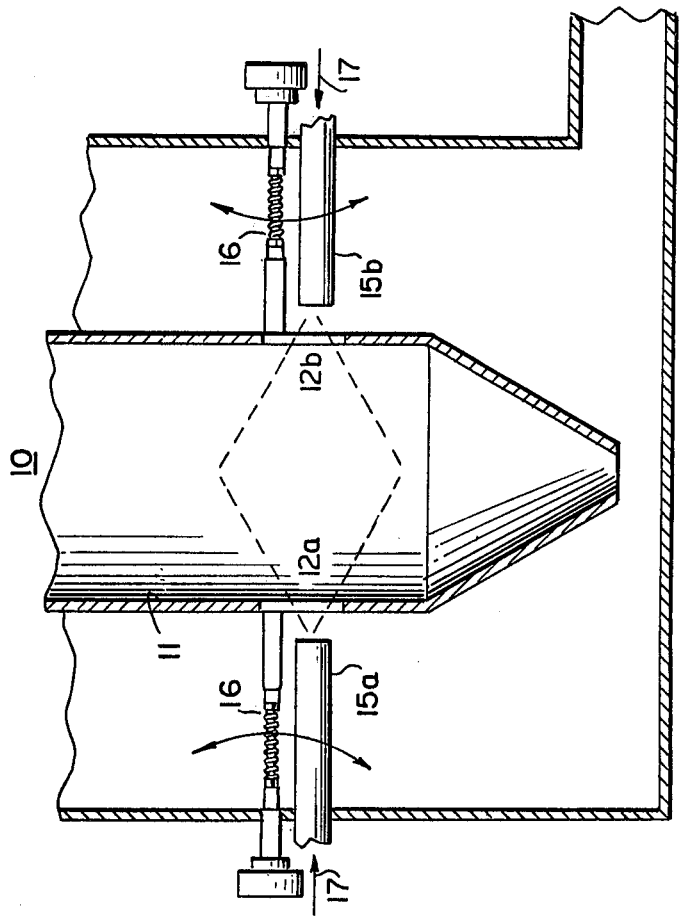
FIG. 1 is an elevational view of the lower furnace section of a boiler partly in section to show the detector system of the present invention.

The boiler configuration illustrated in elevational view, FIG. 1, is one of a number of different types in which the apparatus of the present invention may be adapted to operate. The boiler 10 includes boiler walls 11 and at least one burner. While a number of burners 15a–15b are shown, the apparatus of the present invention is equally adaptable to single and multiple bank burners. The burners 15a–15b inject an appropriate fuel shown by the arrows 17 into respective combustion zones 12a and 12b. The detector system shown generally at 16 view their respective combustion zones 12a or 12b for certain selective frequencies of radiant energy which have been found useful in reliable detection of the flame. For example, the infrared band exists in useful frequencies in the area as 12a or 12b and for this reason, those areas are discussed in further detail.

The burners shown in FIG. 1 may be adapted to be movable so that the combustion zones 12a and 12b move as the respective burners 15a and 15b are moved through an exemplary arc 13 shown in FIG. 1. For example, if it is desired to change the temperature of a certain portion of a boiler, the burners 15a and 15b may be moved downwardly or upwardly so as to regulate the overall temperature of the boiler as is well known in the art. The system of the present invention is adapted so as to move the detector system 16 with the associated burner structure 15 so that the detector system 16 is always viewing the same selected combustion zone 12a or 12b as its associated burner 15a and/or 15b. Thus, the detector 16 is connected with its associated burner structure 15 for movement therewith.

The manner in which the detector system 16 is moved and secured relative to the burners 15a and or 15b may be changed in accordance with the type of boiler.

Figure 2:
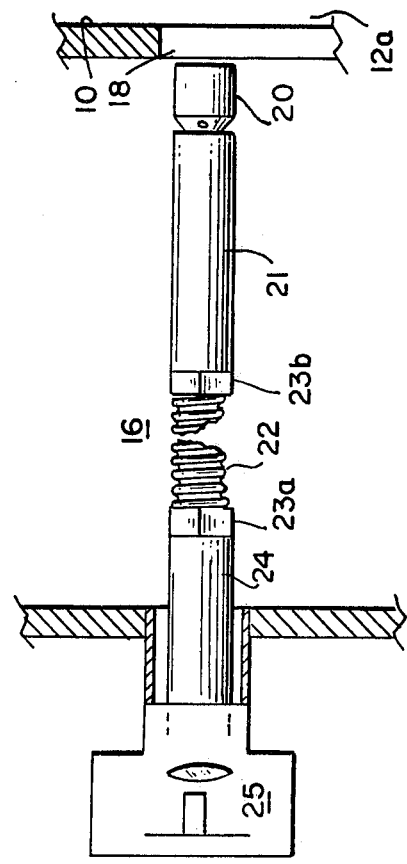
FIG. 2 is a more detailed illustration of the detector system shown in FIG. 1.

In FIG. 2, the detector system 16 associated with burner 15a includes an end piece 20 which is aligned with the combustion zone 12a through a window 18 in the boiler wall 11. The end piece 20 is coupled to a housing 21 which includes a lens system shown in detail in FIG. 3, discussed below. Coupled to the housing 21 is flexible tube structure 22 which flexes as the position of the end piece and housing 21 are moved relative to the combustion zone 12a. The left end of flexible tube 22 is connected by coupling means 23a to an end of the detector housing 24 which includes the detector responsive to incident radiation, which is generally shown at 25. Similarly, coupler means 23b couples the right end of the flexible tube 22 to housing 21.

As previously mentioned, there are a number of kinds of quartz material which are capable of transmitting the preferred range of radiation and in the present invention, materials sold under the trademarks INFRASILL and SUPERSILL manufactured by Amersil, Inc., Hillside, New Jersey, are those which are preferred in the present invention. For reasons discussed further in the specification, these two materials exhibit optical characteristics which have permitted their use in a hostile environment without significant loss of the radiation transmitted by the fiber optics bundle.

As the burner of FIG. 1 is moved for changing the direction of the burner flame, the combustion zone 12a is also affected thereby, such that as the combustion zone changes the end piece 20 and associated housing 21 follow the combustion zone and obtain a uniform line of sight on the combustion zone and therefore provide an accurate detection of the existence of the flame.

Figure 3:
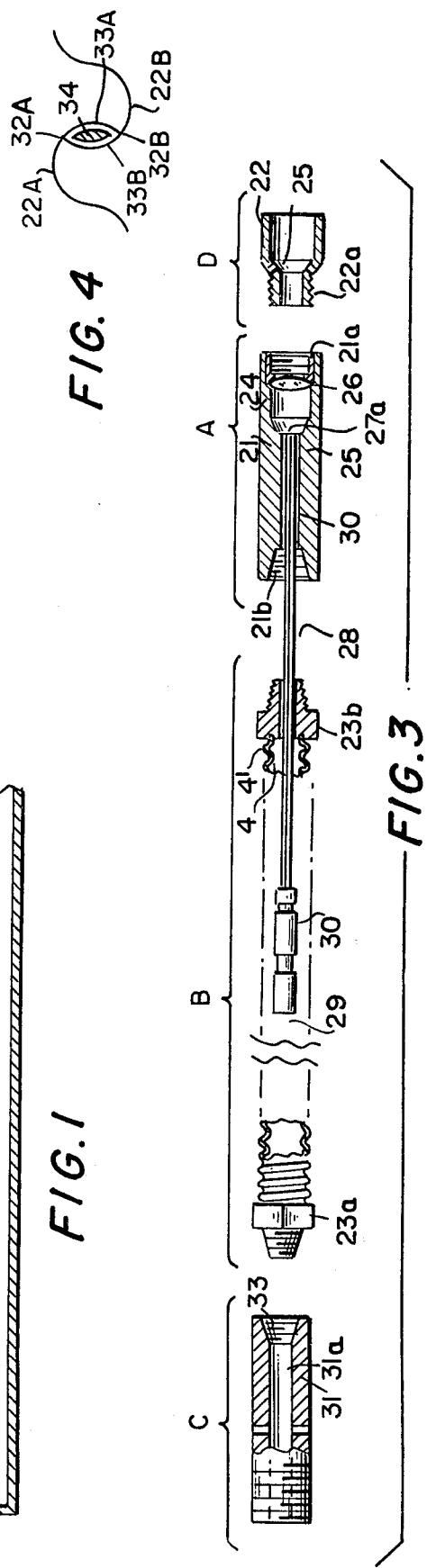
FIG. 3 is an exploded view of the detector system and more specifically the light pipe construction of the detector of FIG. 2.

In FIG. 3 there is shown an exploded view of the light pipe structure wherein end piece 20 is provided with a tapered sleeve member 22a. The sleeved portion 22a engages with an appropriately sleeved portion 21l of the housing 21. The end piece 20, also includes openings 27 which provide for the passage of currents of gas and air so that the end piece 20 does not become clogged with particulate material while viewing the combustion zone of the flame.

The housing 21 has a generally cylindrical opening 19 of varying diameter passing entirely therethrough along a central axis thereof. An annular decent at 29 is adapted to receive a lens 26. The lens is held in place by the end piece 22 being sleeved at 21a, 22a when the apparatus is assembled.

The lens 26 focuses the incident radiation which passes through the end piece 20. This radiation is focused upon one end 27a of a bundle of fiber optics 28. This bundle carries the incident radiation down its entire length to the remote end of the bundle 28 for communication with the detector 25. The fiber optics bundle 28 includes coupling members 30 which are disposed at opposite ends of the fiber optics bundle for securing them in a package and also for coupling the ends thereof with the housing 21 and of detector 25 respectively.

One coupling member 30 engages with the housing member 31 in opening 31a. Coupling means 23a and 23b engage with respective threaded openings 33 and 21b in the housing members 31 and 21 respectively. These couplers secure the light pipe structure as illustrated in FIG. 3.

The fiber optics bundle 28 is specially manufactured by an extrusion process such that the diameter of each of the fibers of the bundle is about 0.019 inches in diameter and the bundle consists of about 30 to 40 fibers. These dimensions and specifications have been found to be useful and effective to transmit sufficient amount of the incident radiation for the purposes of the present invention. However, other dimensions may be utilized if another application were required.

The fiber optics bundle 28 may be manufactured from one of a number of kinds of high purity quartz material possessing in varying degrees the characteristic of being able to transmit ultraviolet and infrared radiation without significant attenuation. There is at least one other material of the high purity quartz type available for transmitting only infrared radiation, which may be used in application when other special energies are not required. The lens 26 is also manufactured from the same materials as the fiber optics bundle. However, the lens might be of one type of material in order to filter out all radiation, except, for example, infrared and therefore simplify the manufacturing process. In such a case, if an IR detector were required, the fiber optics bundle might be manufactured from the high purity quartz material capable of transmitting any of the desired frequencies required. The lens, on the other hand, might be manufactured of the high purity quartz material which would filter out all but the IR range. These are examples of the flexibility which might be built into the system for the various applications and modifications to which the system is adaptable.

Figure 4:
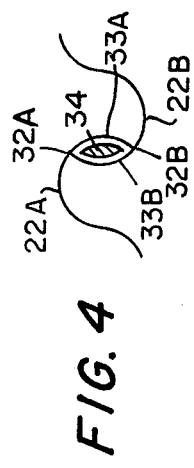
FIG. 4 is a detail of the flexible tube taken along line 4—4 of FIG. 3.

The flexible tube 22 is specially manufactured in the present invention so as to limit the flex of the overall light pipe to the radius of curvature of about four feet when fully flexed. This is necessitated by the characteristics of the fiber optic bundle 28 which, when extruded to the diameters noted above, may exceed their flexibility limits if bent in a tighter radius than 4 feet as indicated above. In order to insure that the tubing 22 of the light pipe structure conforms to the required radius of curvature and constraint, a specially formed flexible tubing 22 structure has been developed. In FIG. 4, a portion of the cross-section of the light pipe is illustrated wherein two adjacent sections 22a and 22b are shown. The flexible tubing 22 basically consists of a helically wrapped metal, preferably stainless steel, with adjacent engaging ends 32a and 32b having the opposite curved arcuate sections 33a and 33b. These sections engage as indicated while a stopping member 34 is fitted between the arcuate sections 33a and 33b as the flexible tube 22 is wrapped. The tube, when bent, will be limited in its flexibility by the inclusion of the stopping member 34 because the ends 32l and 32b will be prevented from approaching each other by the width of the stopping member 34. The width of the stopping member 37 may be varied to give greater or less flexibility to the pipe. However, the particular configuration is provided such that the tube has a radius and curvature limit of 4 feet.

In the present invention, the length of the light pipe structure shown in FIG. 3 may vary from about 4 to about 8 feet. However, it has been found that a greater length may be utilized if the detector housing 24 must be placed at a great distance from the combustion zones 12a and 12b. This increases length capability may be attributed to the superior radiation transmittal qualities of the fiber optics bundle which, as previously noted, does not significantly reduce the energy transmitted from the zone 12a or 12b to the detector 25.

As previously noted in the Background, it has been found that in general, it is necessary to clad individual fibers in a fiber optics bundle in order to reduce interference and optical losses of the fiber optics bundle. This cladding effects the index of refraction of the fiber optics material at the boundary of each of the filaments such that the radiation transmitted is refracted within the bundle.

Since the burner area in a furnace is a severely hostile environment, cladding of fiber optics material is ineffective since the cladding has a tendency to peel and deteriorate, thus reducing the efficiency of the energy transmission. The fiber optics bundle of the present invention utilizes an unclad material which while exhibiting some losses of the radiation, transmits sufficient amount of the energy so as to provide a reliable indication of a flame at the receiving end of the bundle which is coupled to the flame detector 25.

It has been found that the materials chosen for fabricating the fiber optics bundle, namely INFRASILL and SUPERSILL carry sufficient energy for transmission to the flame detector 25 when extruded to a diameter of about 0.019 inches as previously mentioned. This preferred sizing of the fibers as well as the quality of the material itself render the cladding of the fiber optics filaments unnecessary thereby eliminating the problems associated with deterioration of the cladding in the hostile environment of a burner area. The present system therefore reduces the cost of manufacture as well as reducing the possibility of failure of the flame detector system due to a breakdown in the communications link between the end piece 20 and the flame detector 25.

There has thus been shown a system for transmitting information as to the combustion characteristics of a burner utilizing a flame detection apparatus which is capable of following the combustion zone of such a burner and effectively transmitting the information over a light pipe structure capable of superior transmittal qualities.

While there has been shown what at present is considered to be the preferred embodiment of the present invention, it should be obvious to those skilled in the art that various changes and modifications may be made therein without departing from the invention. It is therefore aimed in the appended claims to cover all such changes and modifications as fall within the true spirit and scope of the invention.

I claim:
1. A flame detector device for a boiler furnace comprising:
   a movable mounted burner;
   a radiation sensitive means outside of said furnace and responsive when energized by incident radiation of a selected energy band width to produce a signal indicative of the existence of a flame;
   a lens of quartz material;
   a lens housing supporting said lens, said lens housing being connected with said burner so that said lens is focused on the combustion zone of said burner;
   a flexible tube connected at one end to said housing and at the other end to said radiation sensitive means;
   and a fiber optics bundle extending through said flexible tube for conveying the collected radiation from said lens to said radiation sensitive means, said fiber optics bundle comprising fibers of extruded unclad quartz material capable of conveying radiation without significant loss thereof.

2. The flame detector defined in claim 1 wherein said lens in positioned within a bore in said housing and further comprising an elongated annular end piece threaded into the end of said bore adjacent to said combustion zone, said end piece having a plurality of openings for providing passage for moving gases through said openings so as to prevent clogging of the end piece and blockage of the lens by the accumulation of particulate material present in the vicinity of the combustion zone.

3. The flame detector device defined in claim 2 wherein said housing includes an annular detent in said bore for receiving said lens and said annular end piece engages against and holds said lens in place in said detent.

4. The flame detector apparatus as recited in claim 1 wherein said fiber optics bundle comprises a bundle of about thirty to forty extruded fibers, each with an outer diameter of about 0.187 inches.

5. The flame detector apparatus as recited in claim 1 wherein the optical fibers are capable of transmitting energy of the IR through UV range.

6. The apparatus of claim 1 wherein the optical fibers are capable of transmitting energy in the range from about 2000 angstroms to about 2.5 microns.

* * * * *